(12) United States Patent
Uy

(10) Patent No.: US 11,386,768 B2
(45) Date of Patent: Jul. 12, 2022

(54) REMOTELY CONTROLLING ASPECTS OF POOLS AND SPAS

(71) Applicant: ZODIAC POOL SYSTEMS LLC, Carlsbad, CA (US)

(72) Inventor: Dindo Uy, North Hollywood, CA (US)

(73) Assignee: ZODIAC POOL SYSTEMS LLC, Carlsbad, CA (US)

(*) Notice: Subject to any disclaimer, the term of this patent is extended or adjusted under 35 U.S.C. 154(b) by 0 days.

(21) Appl. No.: 17/128,383

(22) Filed: Dec. 21, 2020

(65) Prior Publication Data

US 2021/0110694 A1    Apr. 15, 2021

Related U.S. Application Data

(60) Continuation of application No. 16/807,673, filed on Mar. 3, 2020, now Pat. No. 10,909,834, which is a continuation of application No. 16/282,247, filed on Feb. 21, 2019, now Pat. No. 10,621,848, which is a division of application No. 15/712,589, filed on Sep.

(Continued)

(51) Int. Cl.
*G08B 21/18* (2006.01)
*G05B 19/042* (2006.01)
*G05B 23/00* (2006.01)
*H04Q 9/00* (2006.01)

(52) U.S. Cl.
CPC ......... *G08B 21/18* (2013.01); *G05B 19/0426* (2013.01); *G05B 23/00* (2013.01); *H04Q 9/00* (2013.01); *G05B 2219/31104* (2013.01)

(58) Field of Classification Search
CPC .......... G08B 21/18; H04Q 9/00; G05B 23/00; G05B 19/0426; G05B 2219/31104
See application file for complete search history.

(56) References Cited

U.S. PATENT DOCUMENTS 7,292,898 B2    11/2007    Clark et al.
7,489,986 B1    2/2009    Laflamme et al.
(Continued)

FOREIGN PATENT DOCUMENTS

AU    2015275057    9/2019
WO    2013163674    11/2013
WO    2014006792    1/2014

OTHER PUBLICATIONS

Aqua Connect(tm) Home Network, Hayward, Available Online at: https://www.hayward-Qool.com/ pdf/manuals/AguaConnectOperationsManual.pdf, 2011, 16 pages.
(Continued)

*Primary Examiner* — Mamadou L Diallo
(74) *Attorney, Agent, or Firm* — Kilpatrick Townsend & Stockton LLP

(57) ABSTRACT

Systems and methods of (remotely) controlling aspects of pools and spas and of modifying water contained therein are detailed. Internet-enabled access to pool and spa controllers may happen without any need for users to create firewall ports or utilize static internet protocol addresses. Certain networking devices may be configured using a USB connection or SD card, avoiding any requirement for an Ethernet cable or supplying separate power to the devices during configuration. Time-varying data may be obtained in respect of one or more installations and analyzed for various information.

2 Claims, 3 Drawing Sheets

Related U.S. Application Data 22, 2017, now Pat. No. 10,255,784, which is a division of application No. 14/711,443, filed on May 13, 2015, now Pat. No. 10,037,675, which is a continuation of application No. 13/346,752, filed on Jan. 10, 2012, now abandoned.

(60) Provisional application No. 61/433,636, filed on Jan. 18, 2011.

(56) References Cited

U.S. PATENT DOCUMENTS

| | | | |
|---|---|---|---|
| 8,319,833 B2 * | 11/2012 | Weinstein | H04N 7/185 348/143 |
| 8,443,063 B1 | 5/2013 | Nelson et al. | |
| 8,465,262 B2 | 6/2013 | Stiles, Jr. et al. | |
| 8,771,504 B2 | 7/2014 | Mastio et al. | |
| 9,097,234 B2 | 8/2015 | Breau et al. | |
| 10,037,675 B2 | 7/2018 | Uy | |
| 10,255,784 B2 | 4/2019 | Uy | |
| 10,375,543 B2 | 8/2019 | McQueen et al. | |
| 10,560,820 B2 | 2/2020 | McQueen et al. | |
| 10,621,848 B2 | 4/2020 | Uy | |
| 10,909,834 B2 | 2/2021 | Uy | |
| 2002/0035403 A1 | 3/2002 | Clark et al. | |
| 2006/0041655 A1 * | 2/2006 | Holloway | H04N 21/42208 709/223 |
| 2006/0168611 A1 | 7/2006 | Fima | |
| 2007/0112939 A1 * | 5/2007 | Wilson | H04L 12/2807 709/219 |
| 2008/0039977 A1 * | 2/2008 | Clark | G05D 23/1905 700/282 |
| 2009/0143917 A1 | 6/2009 | Uy et al. | |
| 2009/0164049 A1 | 6/2009 | Nibler et al. | |
| 2010/0138786 A1 | 6/2010 | McQueen | |
| 2010/0191352 A1 * | 7/2010 | Quail | H04L 12/2809 700/90 |
| 2011/0195664 A1 | 8/2011 | Keirstead et al. | |
| 2011/0258064 A1 * | 10/2011 | Agarwal | G06Q 30/02 705/26.1 |
| 2012/0078426 A1 | 3/2012 | Macey | |
| 2013/0110319 A1 | 5/2013 | Michelon | |
| 2013/0182693 A1 | 7/2013 | Sperling et al. | |
| 2013/0223279 A1 | 8/2013 | Tinnakornsrisuphap et al. | |
| 2013/0282903 A1 | 10/2013 | DeLuca | |
| 2014/0064139 A1 * | 3/2014 | Mcqueen | H04W 48/20 370/254 |
| 2015/0110074 A1 | 4/2015 | Yamasaki et al. | |

OTHER PUBLICATIONS

U.S. Appl. No. 13/346,752, Advisory Action, dated Mar. 13, 2015, 3 pages.
U.S. Appl. No. 13/346,752, Final Office Action, dated Jan. 21, 2014, 11 pages.
U.S. Appl. No. 13/346,752, Final Office Action, dated Nov. 13, 2014, 11 pages.
U.S. Appl. No. 13/346,752, Non-Final Office Action, dated Jul. 9, 2014, 10 pages.
U.S. Appl. No. 13/346,752, Non-Final Office Action, dated Jun. 27, 2013, 9 pages.
U.S. Appl. No. 13/600,567, Advisory Action, dated Feb. 23, 2015, 3 pages.
U.S. Appl. No. 13/600,567, Final Office Action, dated Dec. 9, 2015, 21 pages.
U.S. Appl. No. 13/600,567, Final Office Action, dated Feb. 2, 2015, 23 pages.
U.S. Appl. No. 13/600,567, Non-Final Office Action, dated Mar. 25, 2015, 12 pages.
U.S. Appl. No. 13/600,567, Non-Final Office Action, dated Sep. 5, 2014, 16 pages.
U.S. Appl. No. 13/600,567, Non-Final Office Action, dated Mar. 28, 2014, 17 pages.
U.S. Appl. No. 14/711,443, Non-Final Office Action, dated Nov. 2, 2017, 7 pages.
U.S. Appl. No. 14/711,443, Notice of Allowance, dated May 18, 2018, 8 Pages.
U.S. Appl. No. 14/728,678, Advisory Action, dated Jul. 5, 2018, 3 pages.
U.S. Appl. No. 14/728,678, Final Office Action, dated Mar. 12, 2018, 11 pages.
U.S. Appl. No. 14/728,678, Non-Final Office Action, dated Sep. 11, 2017, 16 pages.
U.S. Appl. No. 15/712,589, Final Office Action, dated Nov. 20, 2018, 11 pages.
U.S. Appl. No. 15/712,589, Non-Final Office Action, dated Jun. 14, 2018, 12 pages.
U.S. Appl. No. 15/712,589, Notice of Allowance, dated Feb. 7, 2019, 8 pages.
U.S. Appl. No. 15/876,560, Corrected Notice of Allowability, dated May 15, 2019, 9 pages.
U.S. Appl. No. 15/876,560, Notice of Allowance, dated Mar. 19, 2019, 13 pages.
U.S. Appl. No. 16/282,247, Non-Final Office Action, dated Jan. 21, 2020, 7 pages.
U.S. Appl. No. 16/282,247, Notice of Allowance, dated Feb. 11, 2020, 7 pages.
U.S. Appl. No. 16/410,544, Corrected Notice of Allowability, dated Oct. 30, 2019, 9 pages.
U.S. Appl. No. 16/410,544, Notice of Allowance, dated Oct. 18, 2019, 18 pages.
U.S. Appl. No. 16/807,673, Non-Final Office Action, dated Jul. 16, 2020, 7 pages.
U.S. Appl. No. 16/807,673, Notice of Allowance, dated Dec. 3, 2020, 7 pages.
Australia Application No. 2015275057, First Examination Report, dated Sep. 25, 2018, 3 pages.
Australia Application No. 2015275057, Fourth Examination Report, dated Feb. 6, 2019, 4 pages.
Australia Application No. 2015275057, Notice of Acceptance, dated May 28, 2019, 3 pages.
Australia Application No. 2015275057, Second Examination Report, dated Sep. 25, 2018, 3 pages.
Australia Application No. 2015275057, Third Examination Report, dated Dec. 13, 2018, 3 pages.
Dhawan, Analogy of Promising Wireless Technologies on Different Frequencies: Bluetooth, Wi Fi, and WiMAX, The 2nd International Conference On Wireless, Wireless Broadband and Ultra wideband Communications, 2007, 9 pages.
European Application No. 12700763.1, Notice Regarding Amended Claims, dated Feb. 20, 2014, 38 pages.
International Application No. PCT/US2012/020694, International Preliminary Report on Patentability, dated Aug. 1, 2013, 7 pages.
International Application No. PCT/US2012/020694, International Search Report and Written Opinion, dated Jun. 27, 2012, 9 pages.
International Application No. PCT/US2013/054261, International Search Report and Written Opinion, dated Mar. 27, 2014, 10 pages.
International Application No. PCT/US2015/033793, International Preliminary Report on Patentability, dated Dec. 22, 2016, 11 pages.
International Application No. PCT/US2015/033793, International Search Report and Written Opinion, dated Sep. 28, 2015, 13 pages.

* cited by examiner

REMOTELY CONTROLLING ASPECTS OF POOLS AND SPAS

CROSS REFERENCE TO RELATED APPLICATIONS

This application is a continuation of allowed U.S. patent application Ser. No. 16/807,673, filed Mar. 3, 2020, having the same title as appears above, which is a continuation of U.S. patent application Ser. No. 16/282,247 (now U.S. Pat. No. 10,621,848, filed Feb. 21, 2019, having the same title as appears above, which is a division of U.S. patent application Ser. No. 15/712,589 (now U.S. Pat. No. 10,255,784), filed Sep. 22, 2017, having the same title as appears above, which is a division of U.S. patent application Ser. No. 14/711,443 (now U.S. Pat. No. 10,037,675), filed May 13, 2015, having the same title as appears above, which is a continuation of U.S. patent application Ser. No. 13/346,752 (now abandoned), filed Jan. 10, 2012, having the same title as appears above, which claims the benefit of and priority to U.S. Provisional Patent Application Ser. No. 61/433,636, filed Jan. 18, 2011, entitled "Methods of Configuring a Wi-Fi Pool Automation Internet Networking Device," the entire contents of which are hereby incorporated by this reference.

FIELD OF THE INVENTION

This invention relates to systems, methods, equipment, and techniques for controlling one or more components of a recreational water recirculation system or modifying one or more characteristics of the water contained within a vessel such as a pool or spa. More particularly, at least some embodiments of the invention relate to Internet-enabled access to residential pool and spa controllers without need for users to create firewall ports or utilize static Internet protocol (IP) addresses. Other embodiments allow connection to controllers without need of a router.

BACKGROUND OF THE INVENTION

U.S. Pat. No. 7,292,898 to Clark, et al., whose contents are incorporated herein in their entirety by this reference, describes various systems for remotely monitoring or controlling pools or spas. Data links may be created between home computer networks and pool/spa controllers and the controllers may be accessed via a combination of the home networks and remote web servers. Data signals may be transmitted to the remote web servers for collection, and command signals may be sent from the remote web servers for purposes of controlling pools and spas.

Controllers of the Clark patent are identified as being "on board" pools and spas. They thus are not in any way remote or separated from the water-containing vessels. Additionally present at or in the pools and spas are sensors "in dynamic communication with the . . . pool or spa water . . . to capture relevant data," which may include information about "temperature, pH, ORP, pump status, heater status, and ozone generation." See Clark, col. 1, ll. 38-48.

Collected data may, according to the Clark patent, be stored either "locally" within the control system or on a remote server. Software algorithms may detect particular error conditions and "alert[ ] a desired recipient via e-mail, direct pager contact or other communication method, and/or activat[e] an audible alarm," See id., col. 4, ll. 17-34. Homeowners and their maintenance services additionally may be notified to add chemicals to pool/spa water as a consequence of data transmissions via the remote server. See id., 11. 55-65.

Contemplated by systems of the Clark patent is use of, among other things, a "filtering router/firewall" used to access the Internet. See id., col. 5, ll. 26-28; FIG. 2. Controllers may be accessed by devices including a web-enabled phone, a home/office computer/or a PDA with a streamlined browser. These and other user access devices/interfaces can perform remote access function, determine chemical conditions in the water with pH or ORP sensors, conduct simultaneous on-line consultations with others including a chemical dealer or maintenance personnel, or receive alarms that the spa cover or pool gate is open.

See id., col. 9, ll. 13-20.

Absent from discussion in the Clark patent are benefits of systems in which users may employ dynamic IP addresses and in which users need not create firewall ports or use routers for purposes of Internet connection. Additionally omitted from disclosure of the Clark patent is any description of configuring wireless fidelity (Wi-Fi) networking devices using, for example, a universal serial bus (USB) connection or a secure digital (SD) card. Such configurations do not require use of any Ethernet cable or provision of separate power to the devices during configuration. They also may be accomplished by an installer, for example, prior to arrival at a residence or installation location.

Likewise omitted from disclosure of the Clark patent is any contemplation of use of data stored on remote servers beyond alerting "desired recipient[s]" to certain error conditions and forwarding water-chemistry information to "a specific chemical supplier or pool/spa maintenance service, or to the homeowner." See id., col. 4, ll. 51-65. Indeed, no aggregating of data is contemplated as to either a single installation or multiple installations. Assessing data aggregated over a given period for a single installation could provide useful information as to trends in either equipment performance or water characteristics at that installation, for example, potentially supplying advance warnings as to equipment degradation or impending water-quality issues. Users also may be furnished energy-usage information and tips for decreasing usage.

Evaluating data aggregated over multiple installations may provide valuable information about regional issues or issues being faced generally by certain types of pools or spas. Such data further could be supplied to retailers, manufacturers, or others for purposes of ensuring adequate inventory of equipment or components if need for multiple repairs or replacements is predicted. Abnormally high use of chemicals and other consumables in a geographic area or in conjunction with certain pools or spas likewise could be discovered and conveyed to homeowners, retailers, and servicers. Yet additional uses of stored data may be made.

SUMMARY OF THE INVENTION

Unlike the Clark patent, the present invention contemplates these multiple uses of data. Additionally, Internet-enabled access to pool and spa controllers may happen without any need for users to create firewall ports or utilize static IP addresses. Wi-Fi networking devices may be configured using a USB connection or SI) card, avoiding any requirement for an Ethernet cable or supplying separate power to the devices during configuration. At least some versions of the invention allow connection to controllers without need of a router.

Systems of the invention may cause servers of the system providers to track dynamic IP addresses typically assigned to computerized devices by Internet service providers (ISPs). Users employing browsers (or local software applications ["apps"]) existing on either fixed or mobile devices may communicate via the Internet with the servers of the system providers and, therethrough, to networking devices and controllers of their pool/spa control systems. Alternate methods of communication are contemplated as well, as are indoor/outdoor use and easy installation of equipment.

It thus is an optional, non-exclusive object of the present invention to provide systems and methods of controlling aspects of pools and spas in which system users need not have static IP addresses or firewall ports.

It is also an optional, non-exclusive object of the present invention to provide systems and methods of controlling aspects of pools and spas in which Wi-Fi networking devices may be configured using a USB connection or SD card or otherwise in a manner avoiding any requirement for an Ethernet cable or supplying separate power to the devices during configuration.

It is another optional, non-exclusive object of the present invention to provide systems and methods of controlling aspects of pools and spas in which connections to controllers may be made without need for routers.

It is a further optional, non-exclusive object of the present invention to provide systems and methods of controlling aspects of pools and spas in which data from either or both of (a) a single installation or (b) multiple installations is aggregated as a function of (at least) time.

It is, moreover, an optional, non-exclusive object of the present invention to provide systems and methods of controlling aspects of pools and spas in which aggregated data is analyzed to identify trends in either equipment performance or water characteristics at one or more installations.

It is an additional optional, non-exclusive object of the present invention to provide systems and methods of controlling aspects of pools and spas in which data analysis may result in supplying to users advance warnings as to equipment degradation or impending water-quality issues or energy-usage information (or both).

It is yet another optional, non-exclusive object of the present Invention to provide systems and methods of controlling aspects of pools and spas in which aggregated data from multiple installations is evaluated for information about regional issues or issues being faced generally by certain types of pools or spas.

Other objects, features, and advantages of the present invention will be apparent to those skilled in the relevant art with reference to the remaining text and the drawings of this application.

DETAILED DESCRIPTION

Figure 1:
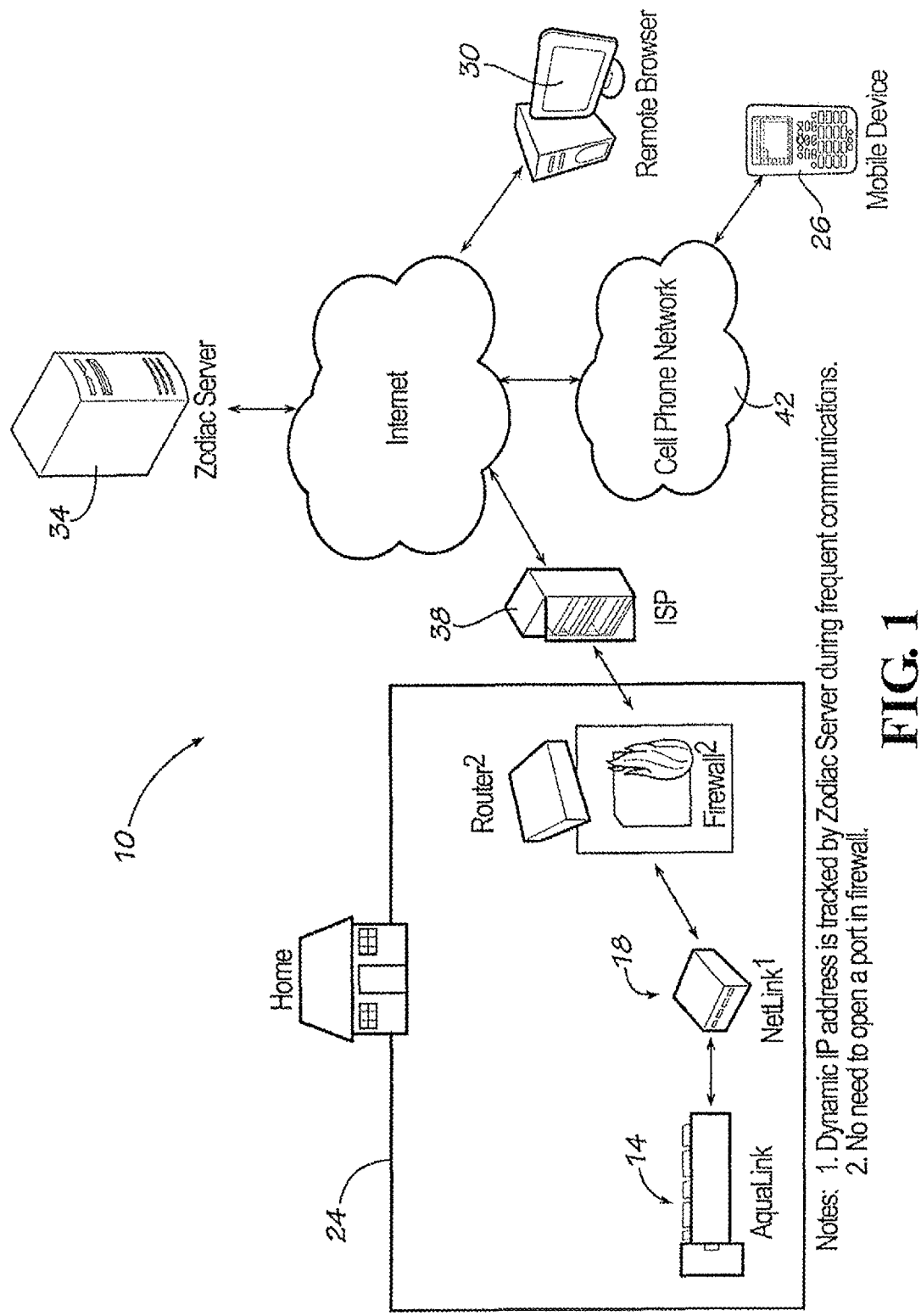
FIG. 1 is a schematicized diagram of aspects of an exemplary system of the present invention.

Illustrated in FIG. 1 are aspects of exemplary system 10 of the present invention. Included as part of system 10 may be computerized controller 14. As shown in FIG. 1, controller 14 may be any of the AquaLink brand of controllers made by Zodiac (formerly known as Jandy). Signals may be sent to and from controller 14 wirelessly, via wires, or in hybrid manner. Regardless of its signal transmission method, controller 14 is designed to control operation of equipment associated with pools and spas; such equipment includes, but is not limited to, water jets, lights, pumps, heaters, active filters, etc.

Networking device 18 also may be included as part of system 10. Device 18 may be any suitable automated apparatus capable of receiving and transmitting signals via the Internet or other network. Information may be transferred among device 18 and controller 14, to which device 18 connects via wires or wirelessly.

Also depicted in FIG. 1 is optional router 22. If present as part of system 10, router 22, as well as controller 14 and device 18, typically may constitute at least part of a single "home" installation 24 and thus typically are present at the installation site. Likewise preferably present at the site are at least one of a pool or spa to be controlled by controller 14. Unlike the controller of the Clark patent, however, controller 14 need not be "on board" any pool or spa, and instead may be located either within or outside the home. Additionally, persons skilled in the relevant art will recognize that reference to "home" installation 24 need not mean only a residential site, but rather may include commercial, association, or other pools or spas too.

System 10 also may include means for accessing the Internet. Such means may include mobile and fixed devices 26 and 30, respectively. Indeed, any device 26 or 30 (including but not limited to conventional smart phones, laptop computers, and desktop computers) equipped with a web browser or local app may be used consistent with the present invention to access the Internet. A device 26 or 30 may be in the control of the user of system 10 responsible for maintenance of a particular pool or spa, whether that user be a homeowner, a service company, an equipment manufacturer, or otherwise. Devices 26 and 30 likewise need not be "on board" a pool or spa but instead may be remote therefrom if and when desired.

Also illustrated in FIG. 1 are one or more servers 34. Servers 34 preferably are maintained by the provider of controller 14 and device 18, although this need not necessarily be true. Because in some versions of system 10 either or both of controllers 14 and devices 18 will be supplied by Zodiac, a server 34 is identified in FIG. 1 as a "Zodiac Server."

Servers 34 also may function to assist in aggregating data from one or more installations 24 for purposes of data analysis and evaluation. In this respect servers 34 are illustrated in FIG. 1 as proxies for computerized information processing systems. As noted earlier, assessing data aggregated over a given period for a single installation 24 could provide useful information as to trends in either equipment performance or water characteristics at that installation 24, for example. Advanced warning as to equipment degradation or impending water-quality issues thus could be provided to a device 26 or 30. Via device 26 or 30 users also may be furnished energy-usage information and tips for decreasing usage. Similarly as noted above, evaluating data aggregated over multiple installations 24 may provide valuable information about regional issues or issues being faced generally by certain types of pools or spas.

Information from sources other than installations 24 also may be analyzed and evaluated, typically (but not necessarily) in conjunction with data obtained from installations 24.

For example, historical temperature and other weather-related information could be considered in developing control signals for one or more installations 24. Similarly, weather forecasts may be considered so that, if an upcoming time period is expected to be warmer (or cooler), wetter (or dryer), etc., than normal, controls for certain installations 24 may be adjusted anticipatorily.

As occurs conventionally, Internet-accessible devices at a residence or other location (such as an installation 24) are assigned IP addresses by an ISP servicing the location. Existing pool/spa controllers typically require assignment of a static (i.e. unchanging) IP address disfavored by ISPs. Instead, ISPs favor provision of dynamic (i.e. time-varying) IP addresses to devices, as the ability to reassign (and thus share) addresses frequently allows ISPs more flexibility in performing their services.

In system 10, device 18 need not have a static IP address. Rather, device 18 may be assigned a dynamic IP address by ISP 38. Server 34 tracks the IP address of device 18 so as to remain able to communicate with device 18 notwithstanding the time-varying nature of its address. Because server 34 does so and no static IP address is required for device 18, no especial need exists to open a port in any computer firewall associated with installation 24.

Figure 2:
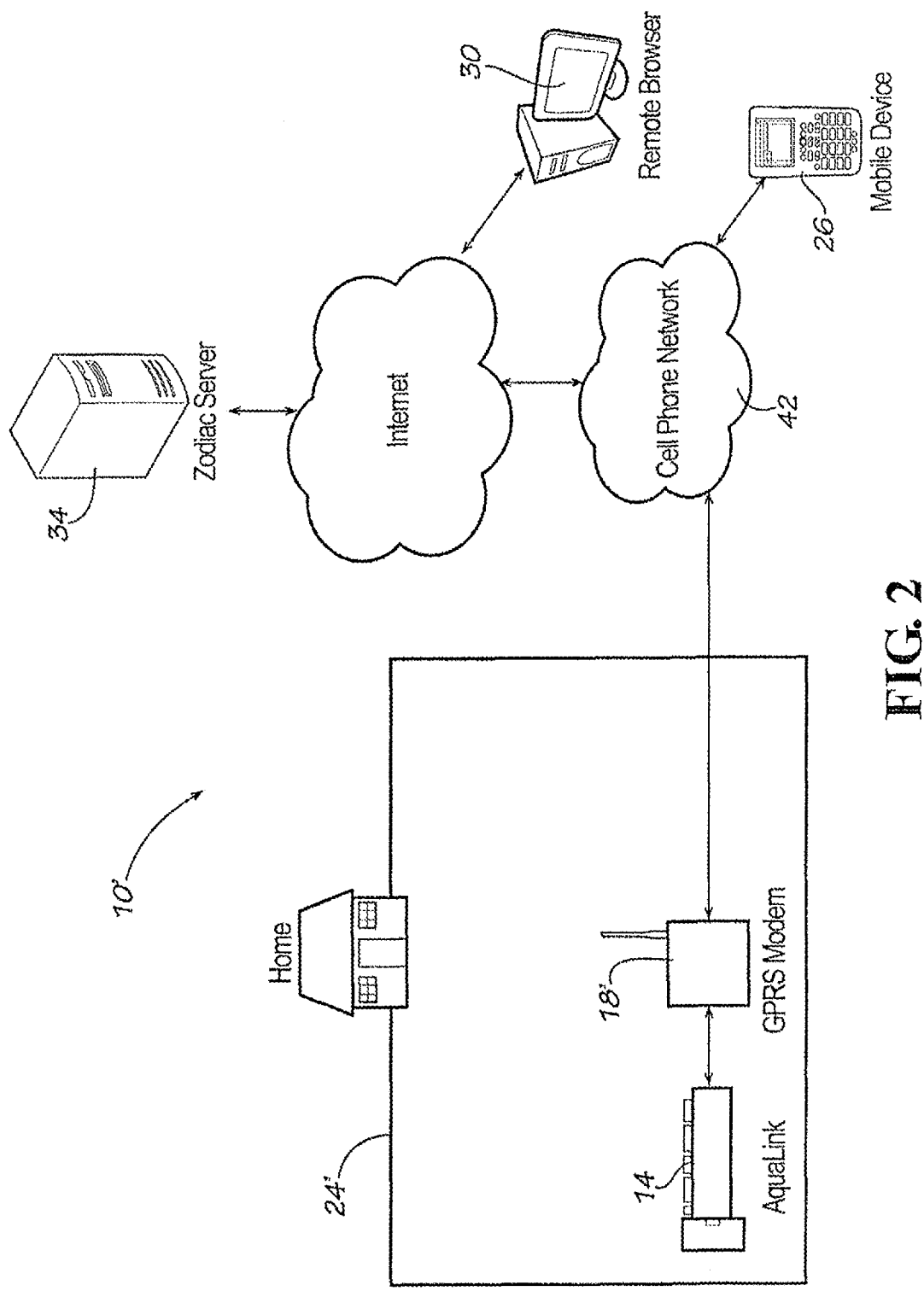
FIG. 2 is a schematicized diagram of aspects of an alternate system of the present invention.

FIG. 2 shows an alternate system 10' consistent with the present invention. System 10' may include servers 34 and allow devices 26 and 30 to communicate with servers 34 via the Internet, as with system 10. It further may include controller 14 as part of installation 24', like installation 24. Unlike installation 24, however, installation 24' may utilize device 18' in the form of a modem to communicate with servers 34. Device 18' may be configured to the standards of the general packet radio service (GPRS) or otherwise as appropriate, and any or all of device 18', mobile device 26, or even fixed device 30 may connect wirelessly to cell phone network 42 (see also FIG. 1). System 10' avoids any need for router 22, for example.

Figure 3:
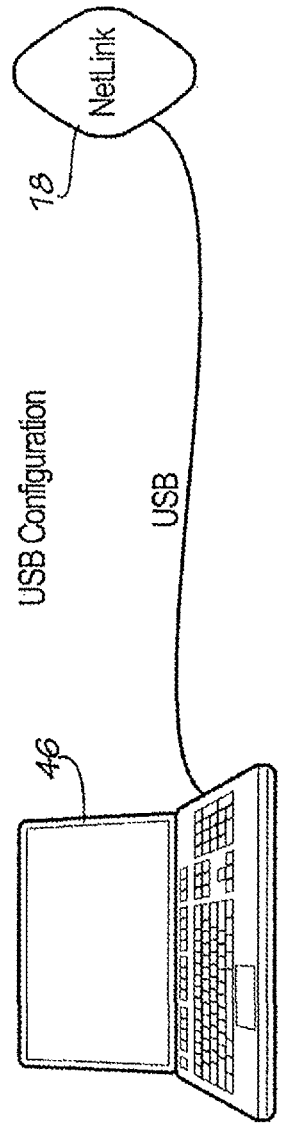
FIG. 3 is a schematicized diagram of a first exemplary WiFi-configuration method.
Figure 4:
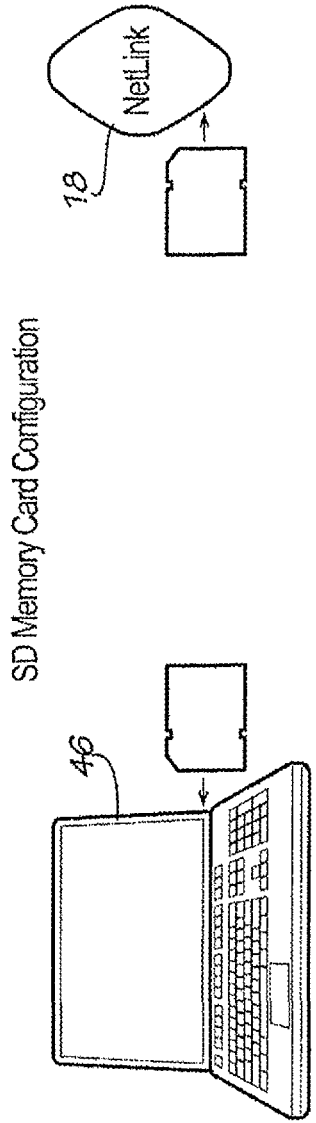
FIG. 4 is a schematicized diagram of a second exemplary Wi-Fi configuration method.

FIGS. 3-4 schematically illustrate certain differing ways to configure device 18 for communication with router 22. If device 18 and router 22 communicate via wires, an Ethernet or other cable may be employed to connect the two components. By contrast, wireless communication may be established as shown in FIG. 3, for example. Detailed in that figure is that device 18 may be connected to a USB port of a desktop or laptop personal computer (PC) 46 intended to communicate with router 22. As so connected to computer 46, device 18 is recognized by computer 46 as a storage device or drive. WiFi configuration may then occur by opening a configuration file, entering WiFi settings (including, for example, service set identifier [SSID] and password information), and saving the entered settings in the memory of device 18. Thereafter device 18 may be disconnected from the USB port of computer 46 and installed or located wherever desired (e.g. outside at a pool/spa equipment pad or inside a residence) so as to communicate with controller 14.

Alternatively, as depicted in FIG. 4, an SD memory card may be inserted into an appropriate port of computer 46. WiFi configuration may occur by opening a configuration file, entering WiFi settings, and saving the entered settings on the SD card. The card then may be removed from computer 46 and inserted into an appropriate port of device 18 to download the saved settings into the device 18. Again, device 18 may be installed or located wherever desired so as to communicate with controller 14.

In each situation identified in FIGS. 3-4, WiFi configuration is easily accomplished without use of an Ethernet cable. Further, configuration may completed by an installer prior to arriving at an installation 24. Yet additionally, no separate power need be supplied to device 18 during configuration. Of course, persons skilled in appropriate fields of endeavor will understand that device 18 may be configured in myriad ways, and the techniques of FIGS. 3-4, while easy and valuable, need not always be utilized.

Based at least in part on information obtained or derived from sensors associated with a pool or spa, controller 14 may be used to control pool/spa equipment as desired to achieve certain results. As communication with servers 34 occurs, servers 34 may receive information from various installations 24 and 24'. Such information typically will vary as a function of time (e.g. a chlorine level in a pool of a particular installation 24 or 24' likely will change over time) and, perhaps, other variables. Moreover, such information typically will vary from installation to installation, especially if installations are remote geographically or contain different equipment. In any event, servers 34 may receive information that usefully may be analyzed in various ways to alert users or others as to issues currently or potentially to be encountered at installations.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. A method of assessing information relating to a swimming pool located at a first location, comprising:
   a. receiving, at a second location remote from the first location, information relating to the swimming pool;
   b. assessing the received information together with a weather forecast for the first location; and
   c. informing an owner, user, or servicer of the swimming pool of the assessment.

2. A method of assessing information relating to a swimming pool located at a first location, comprising:
   a. receiving, at a second location remote from the first location, information relating to the swimming pool;
   b. assessing the received information together with historical temperature information for the first location; and
   c. informing an owner, user, or servicer of the swimming pool of the assessment.

* * * * *